United States Patent [19]
Smith, III

[11] Patent Number: 6,123,104
[45] Date of Patent: Sep. 26, 2000

[54] UNDERSEA HYDRAULIC COUPLING WITH Y-SEAL

[75] Inventor: Robert E. Smith, III, Missouri, Tex.

[73] Assignee: National Coupling Company Inc., Stafford, Tex.

[21] Appl. No.: 09/510,604

[22] Filed: Feb. 22, 2000

[51] Int. Cl.[7] .................................................. F16L 29/00
[52] U.S. Cl. ................... 137/614.04; 251/149.7; 285/108; 285/110; 285/917
[58] Field of Search .................. 137/614.04, 614.03, 137/614; 285/108, 110, 111, 917; 251/149.7

[56] References Cited

U.S. PATENT DOCUMENTS

| | | | |
|---|---|---|---|
| 4,637,470 | 9/1998 | Weathers et al. | 137/614.04 X |
| 4,884,584 | 12/1989 | Smith | 285/108 |
| 5,015,016 | 5/1991 | Smith, III | 137/614.04 |
| 5,355,909 | 10/1994 | Smith, III | 285/111 |
| 5,810,047 | 9/1998 | Kirkman | 285/917 X |
| 5,810,048 | 9/1998 | Zeiner-Gundersen | 137/614.04 |

*Primary Examiner*—Kevin Lee
*Attorney, Agent, or Firm*—Fulbright & Jaworski

[57] ABSTRACT

An undersea hydraulic coupling having a metal seal with a Y-shaped cross section that provides a face type seal between the male and female coupling members is disclosed. The inner circumference of the Y-shaped seal remains engaged with the face of the male member even when there is partial separation of the members, without any pre-loading devices. If the male member is partially removed from the female member bore, a face-type seal is maintained with the face of the male member and a sliding radial seal is maintained with the receiving chamber wall. The seal slides with the male member as it is partially withdrawn from the female member receiving chamber.

17 Claims, 5 Drawing Sheets

UNDERSEA HYDRAULIC COUPLING WITH Y-SEAL

BACKGROUND OF THE INVENTION

1. Field of the Invention

This invention relates, in general, to hydraulic couplings and specifically to hydraulic couplings used in undersea drilling and production applications. More particularly, the invention involves an undersea hydraulic coupling having a pressure energized Y-shaped metal seal that engages the face of the male member, the female member bore and an internal shoulder in the bore, to provide a radial seal and face seal between the coupling members.

2. Description of Related Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

A check valve may be installed in the female member and also in the male member. Each check valve is opened when the coupling is made up; however, each check valve closes when the coupling is broken so as to prevent fluid from leaking out of the system of which the coupling is a part.

In U.S. Pat. Nos. 4,694,859 and 5,762,106 to Robert E. Smith, III, an undersea hydraulic coupling and radial metal seal is disclosed. A reusable metal seal engages the circumference of the probe when it is positioned within the female member body. The seal is held in place by a cylindrical body or retainer. When the male and female portions of the coupling are parted under pressure, the retainer prevents the metal seal from blowing out through the bore of the female member.

U.S. Pat. No. 4,637,470 to Gary G. Weathers et al discloses a subsea hydraulic coupling having a resilient metal sealing ring having two lips that face inwardly, defining a general V-shape. Belleville washers are used to maintain the male member face in sealing engagement with the sealing ring. Additionally, fluid pressure in the female member bore will tend to expand the lips of the seal ring to maintain a tight seal between the face of the male member and the shoulder in the female member bore.

U.S. Pat. No. 5,015,016 to Robert E. Smith, III discloses a subsea hydraulic coupling having an internal pressure loaded V-seal that engages the leading face of the male member and a sleeve inserted into the female member bore. The V-seal is preloaded to prevent leakage at low pressures. When the system is pressure energized, the sleeve member urges toward the male member to keep the V-seal engaged with the male member. The pressure causes the V-seal to expand longitudinally against the leading face of the male member and the internal shoulder of the sleeve member.

U.S. Pat. No. 5,355,909 to Robert E. Smith, III discloses an undersea hydraulic coupling having a pair of hollow metal seals which are pressure energized to seal between the male and female members of the coupling. One of the hollow metal seals is configured to expand radially while the second hollow metal seal is compressible along the longitudinal axis of the coupling. These seals provide a fluid tight sealing arrangement upon pressurization of the coupling without the need for external preload devices.

U.S. Pat. No. 5,979,499 to Robert E. Smith, III discloses an undersea hydraulic coupling having a ring-shaped metal seal that is held in place between the female member body and a sleeve-shaped seal retainer. The annular metal seal includes a lip or leg section which is clamped in place between the female member body and the seal retainer. A hollow portion of the seal extends radially inwardly from the lip portion of the seal and is expansible to form a fluid tight seal against the body of the male member. The hollow portion of the seal is preferably cylindrical in cross section.

U.S. Pat. No. 4,884,584 to Robert E. Smith, III discloses an internally preloaded metal-to-metal seal hydraulic coupling having a seal member that is allowed to float, or slide, longitudinally within the bore of the female coupling member between a first, extended position and a second, compressed position. The seal member is biased by a preload mechanism into its first extended position. A force resulting from engagement of the male member and the seal member tends to urge the seal member towards its second, compressed position and that force is opposed by the preloaded mechanism. An annular metal ring seal may be used to provide a sliding fluid seal between the outer circumference of the seal member and the bore of the female.

Some types of hydraulic couplings with face-type metal-to-metal seals require external preload devices for the seal. An external preload mechanism typically is used to prevent relative longitudinal movement between the male member and the female member and, as a result, disengagement of the seals. A problem with external preload devices is the devices must overcome the fluid pressure which may urge the members apart. The external device must not only partially energize a seal, but also overcome the hydraulic pressure which urges the members to separate. This is a serious problem particularly when high pressure is desired for hydraulic lines, and in such a case the hydraulic pressure may overcome the preload device and the sealing relationship may be lost.

The sealing relationship also may be lost in prior art couplings with face-type seals that do not employ external preload devices. This problem is caused by any relative longitudinal movement of the coupling members. Any longitudinal movement between the members can not be tolerated without sacrificing the sealing relationship.

While face-type seals have certain disadvantages in undersea hydraulic couplings, radial seals allow substantial separation of the coupling members. However, radial seals may require seal retaining devices and tolerances or dimensional irregularities may diminish the effectiveness of radial seals. It is desirable to enhance the effectiveness of the seal by designing an undersea hydraulic coupling that will allow some separation of the coupling members without the need for pre-load devices, and that assures the seal remains fully engaged between the male and female members. Thus, an undersea hydraulic coupling is needed having a face-type metal seal that tolerates substantial separation of the male and female members.

SUMMARY OF THE INVENTION

The present invention overcomes the above-mentioned problems and disadvantages by providing a coupling with a pressure-energized Y-shaped metal seal that engages the leading face of the male member, and also provides a sliding radial seal that remains engaged when the coupling members are partially separated. The seal of the present invention requires no external preload device. During connection of the coupling members, the male member enters the female member bore and the face of the male member compresses the inner circumference of the seal to provide a face-type seal between the male member leading face and an internal shoulder in the receiving chamber of the female member. The male member can separate partially from full engagement with the female member and remain sealed due to flexing and pressure energizing of the inner circumference of the seal. Once the limit of this flexing is reached and the male is removed further out of the female member receiving chamber, the metal seal slides with the male member up the bore of the female member. As the metal seal slides, the inner circumference of the seal remains engaged with the leading face of the male member, and the outer circumference of the metal seal is engaged with the female member bore. As the coupling members are partially separated, the metal seal provides a radial fluid tight seal between the male member and the female member bore and remains engaged between the male and female coupling members. The outer circumference of the metal seal is preferably pressure energized and, if desired, may be preloaded by an interference fit when inserted into the female member receiving chamber. By pressure-energizing and/or preloading the outer circumference of the metal seal, sufficient force remains applied to this part of the seal to maintain a sliding fluid-tight radial metal seal even when the coupling members are partially separated.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF PREFERRED EMBODIMENTS

Undersea hydraulic couplings are generally attached to opposing plates of a manifold and are held together by bolts or hydraulic members attached to the plates. The male and female members may be attached to the opposing plates using various means, such as set screws or threads. Techniques for attaching members to such plates are well known to those skilled in the art. Typically, one of the manifold plates is attached to a well head assembly, while the opposing plate is positionable subsea and is moveable. Attached to the male junction plate are a number of male coupling members. Typically between 10 and 30 coupling members are attached to a single junction plate. The female coupling members are connected to a female manifold or junction plate. Guide means are provided to align the male junction plate and female junction plate. Whether connected individually or to opposing junction plates, the coupling members are subject to forces tending to separate the coupling members.

Figure 1:
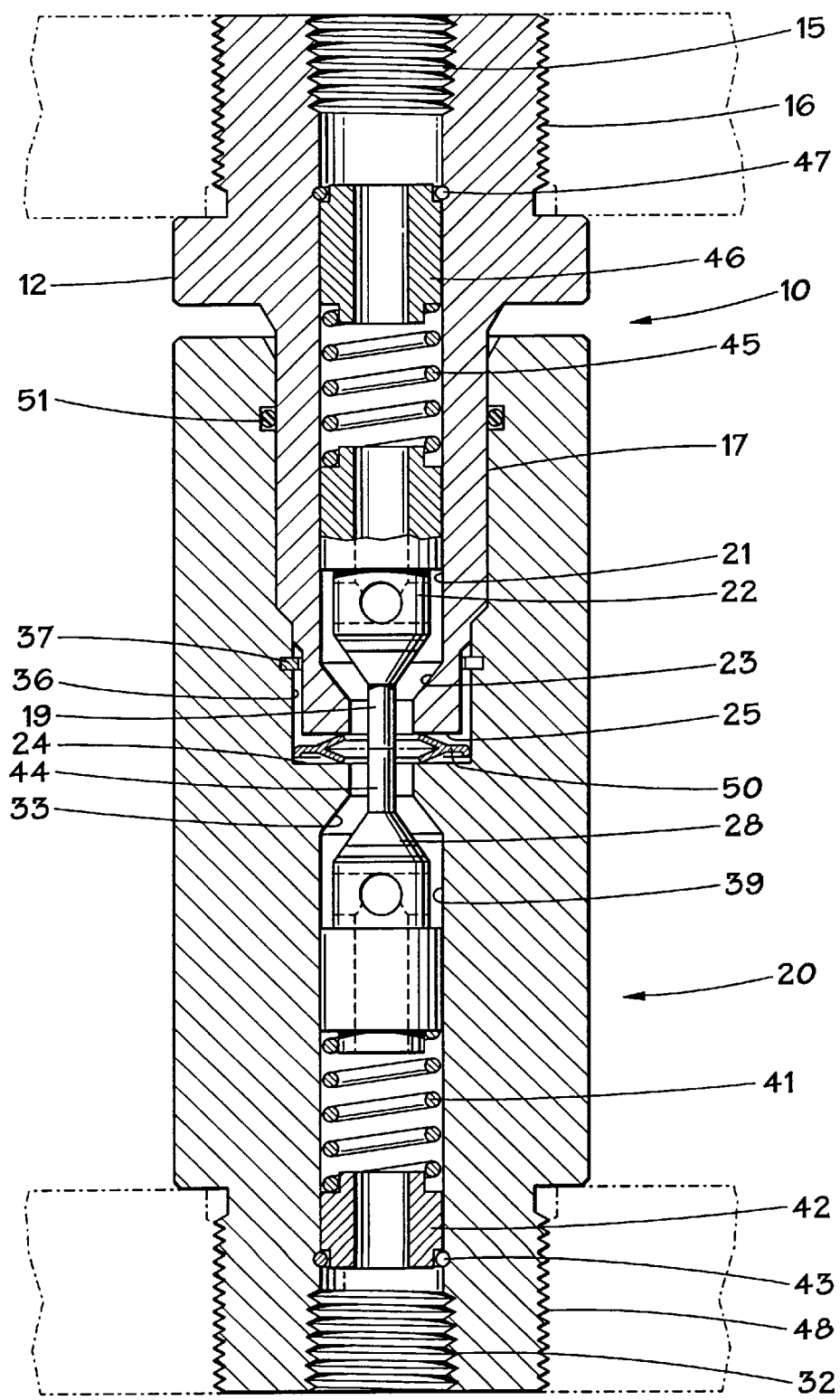
FIG. 1 is a section view of the male member and female member of the coupling when the coupling members are fully engaged, according to a first preferred embodiment of the invention.
Figure 3:
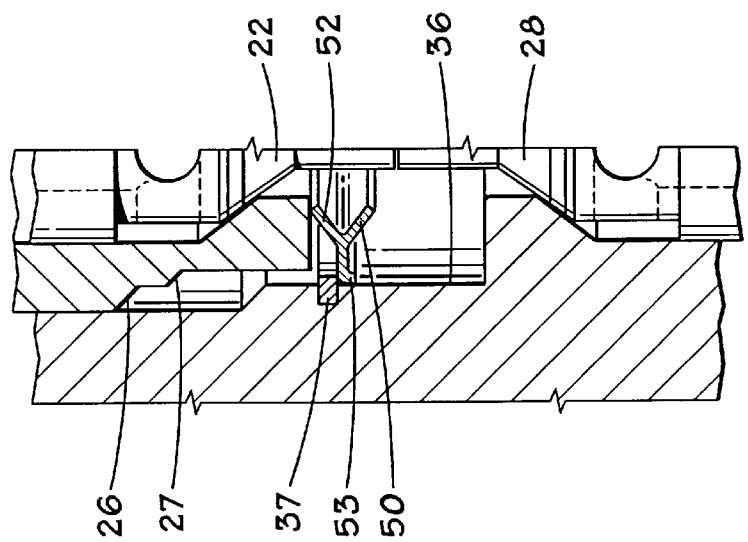
FIG. 3 is an expanded section view of the metal seal according to the embodiment of FIGS. 1 and 2.

Now referring to FIG. 1, in a first preferred embodiment the male member 10 comprises a threaded handle 16 which may be attached to a manifold plate. The handle adjoins flange 12 of the male member, which adjoins cylindrical probe 17 and terminates at probe face 25. The cylindrical probe 17 is adapted for sliding engagement with the female member 20 as will be described below. The male member or probe may have several variations in its diameter and, as shown in FIG. 3, the male member may have inclined shoulders 26 and 27 on its outer circumferential surface. The body of the male member also is provided with a central bore 21. At a first end of the bore is a threaded section 15 for connection to hydraulic lines. The bore may have several variations in its diameter as it extends through the body of the male member.

A valve assembly is slidably received within the bore 21 of the male member. The valve assembly comprises a conical poppet valve 22 which seals against the valve seat 23 in its normally closed position. Helical valve spring 45 urges the poppet valve into a closed position against the valve seat. The helical valve spring 45 is located within central bore 21 and is anchored by spring collar 46 which is held in place by collar clip 47 that is engaged with the inner surface of the central bore of the male member. A valve actuator 19 extends from the apex of the poppet valve 22. When the poppet valve actuators of the male and female members engage, the valves are urged open to introduce the flow of hydraulic fluid between the male and female coupling members.

Female member 20 comprises a body having a central bore 39 which has several variations in its diameter as it extends through the female member. In a first preferred embodiment, the first end of the bore comprises an internally threaded section 32 for connection to a hydraulic line. A valve assembly in the female member bore 39 comprises poppet valve 28 which is slidably received within the bore. Poppet valve 28 is conical and is urged by valve spring 41 into a seated position against valve seat 33. When the poppet valve is in a closed position against the valve seat, the valve seals hydraulic fluid from flowing between the male member and female member. Spring collar 42 anchors valve spring 41 and is held in place by collar clip 43. The female member preferably includes a handle 48 which may be threaded to a manifold plate.

In the first preferred embodiment shown in FIG. 1, seal 50 is a metal ring with a Y-shaped cross section. In a first position, the metal seal is located with its inner circumference abutting internal shoulder 24 in the female member bore. This portion of the female member bore is cylindrical and is dimensioned to slidably receive the male member, and is referred to as the receiving chamber. As shown in FIG. 1, when the male member is fully inserted into the receiving chamber and the poppet valve actuator 19 of the male member engages the poppet valve actuator 44 of the female member, hydraulic fluid is transmitted between the coupling members. Hydraulic fluid pressure energizes the cavity between the opposing lips or legs of the inner circumference of metal seal 50 to provide a face type seal between leading face 25 of the male member and shoulder surface 24 in the receiving chamber. As will be described in more detail below, the outer circumference of metal seal 50 also engages the wall of the receiving chamber 36.

Figure 2:
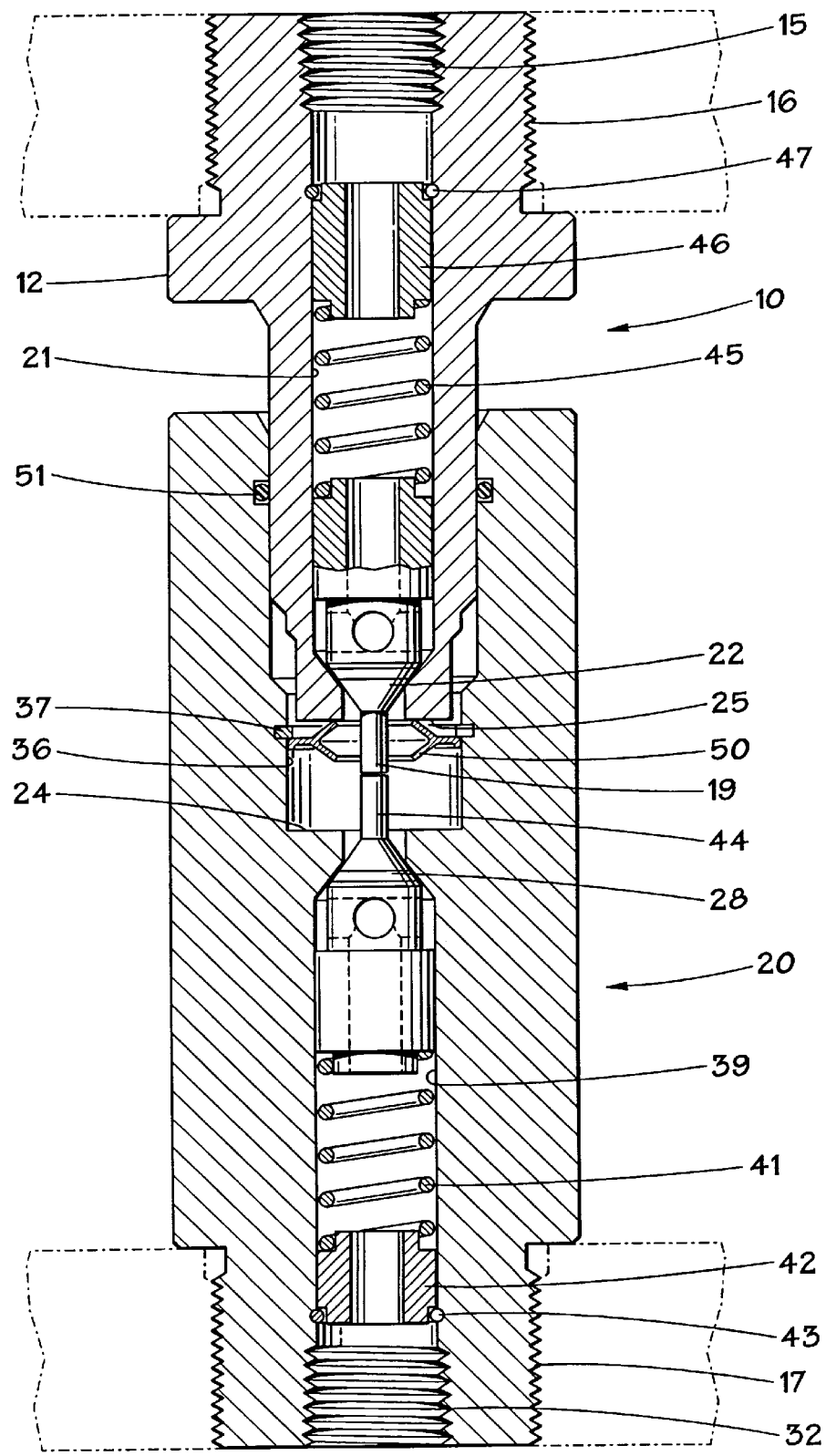
FIG. 2 is a section view of the male member and female member of the coupling when the male member has been partially removed from the female member receiving chamber, according to the first embodiment.

Now referring to FIG. 2, the undersea hydraulic coupling of the present invention is shown with male member 10 partially withdrawn from the female member receiving chamber 36. In FIG. 2, the seal is shown in a second position spaced longitudinally from the first position. In the second position, one of the lips or legs at the inner circumference of metal seal 50 remains sealed with the male member, while the opposing leg has disengaged from the shoulder in the receiving chamber. The outer circumference of the seal remains engaged with the wall of the receiving chamber.

Before reaching the second position shown in FIG. 2, the inner circumference of the seal flexes sufficiently to allow some relative movement of the male member with respect to the female member before one of the legs at the seal inner circumference disengages the shoulder in the receiving chamber. In fact, the male member can separate partially from full engagement into the female member receiving chamber and still maintain a seal against the shoulder due to flexing and pressure energizing of the opposing lips or legs at the inner circumference 52 of the seal. Once the limit of this flexing is reached and the male comes further out of the female member receiving chamber, one of the lips or legs of the seal disengages the shoulder surface of the receiving chamber. The outer diameter 53 of the metal seal maintains a seal with the female member receiving chamber wall as the seal slides toward the second position. As the male member is withdrawn partially from the receiving chamber, the inner circumference 52 of the seal remains engaged with face 25 of the male member, and the outer circumference 53 of the seal remains engaged with the wall 36 of the receiving chamber as the seal follows the face of the male member, until the seal reaches retainer clip 37 which holds the metal seal in the female bore when the coupling members are completely separated.

Figure 4:
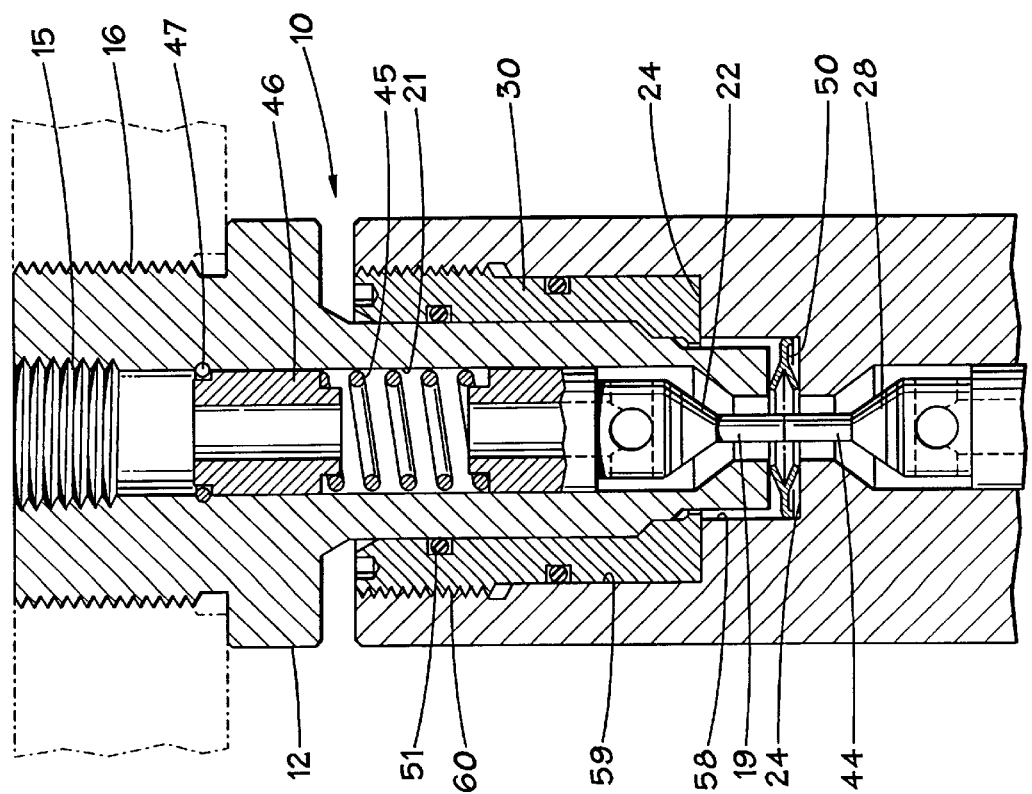
FIG. 4 is a section view of the male member and female member of the coupling when the coupling members are assembled together, according to a second preferred embodiment of the invention.

As shown in FIG. 4, in a second embodiment of the invention, seal retainer 30 is used instead of a retainer clip to prevent the seal from being lost when the coupling members are separated. The seal retainer is threaded at 60 to the female member. The female member has an internal bore section 59 for insertion of the seal retainer 30 therein, to abut internal shoulder 24. The outer circumference of metal seal 50 slides up and seals against the wall 58 of the female member receiving chamber until the seal reaches the seal retainer 30, as the male member is partially separated from the female member.

Figure 5:
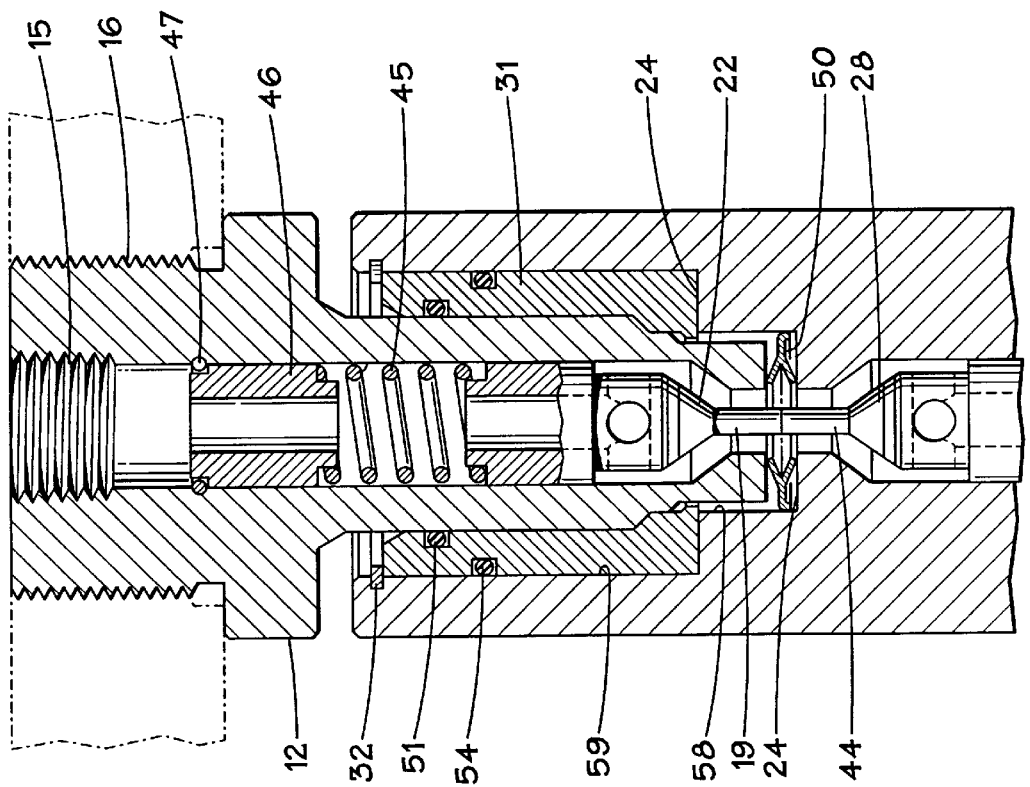
FIG. 5 is section view of the male member and female member of the coupling according to a third preferred embodiment of the invention.

In FIG. 5, a third embodiment of the present invention is shown. In this embodiment, seal retainer 31 is inserted into the bore 59 in the female member and is held in place with clip 32. Seal retainer 31 also limits the travel of metal seal 50 as the male member is partially withdrawn from the receiving chamber. An O-ring seal 54 may be used around the outer circumference of the seal retainer 31. Additionally, O-ring 51 may be used to seal around the inner circumference of the seal retainer to engage the probe wall.

Figure 6:
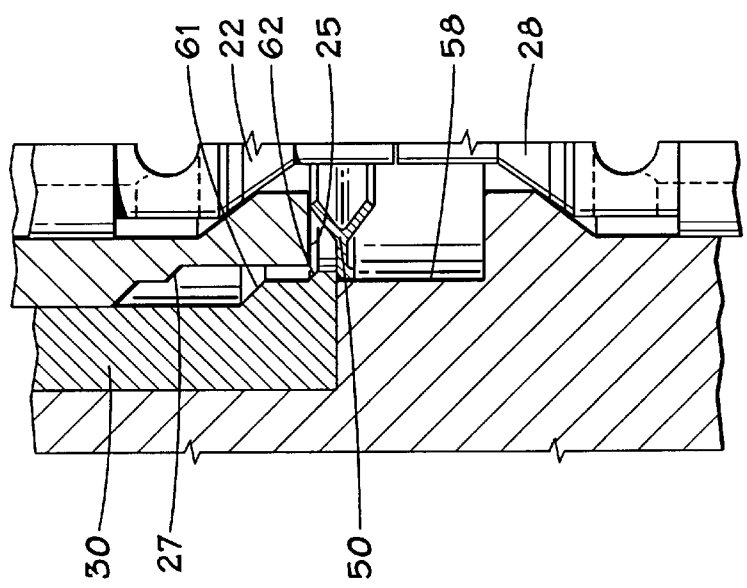
FIG. 6 is an expanded section view of the metal seal according the embodiment of FIG. 5.

Now referring to FIG. 6, an expanded section view of seal retainer 30 is shown. In this embodiment, the seal retainer has a pair of inclined shoulders 61, 62 in its central bore. As shown in FIG. 6, the outer circumferential surface of metal seal 50 slides up the wall 58 of the receiving chamber until it reaches seal retainer 30. As the male member is partially withdrawn from the female member receiving chamber, the inner circumference of seal 50 remains engaged with the leading face 25 of the male member.

Figure 9:
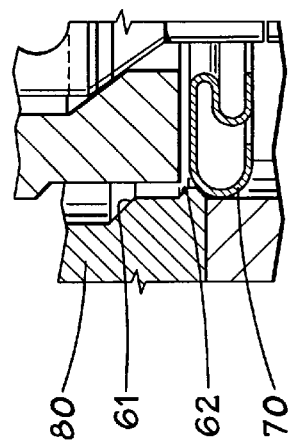
FIG. 9 is an expanded section view of the metal seal according to a fifth preferred embodiment.
Figure 7:
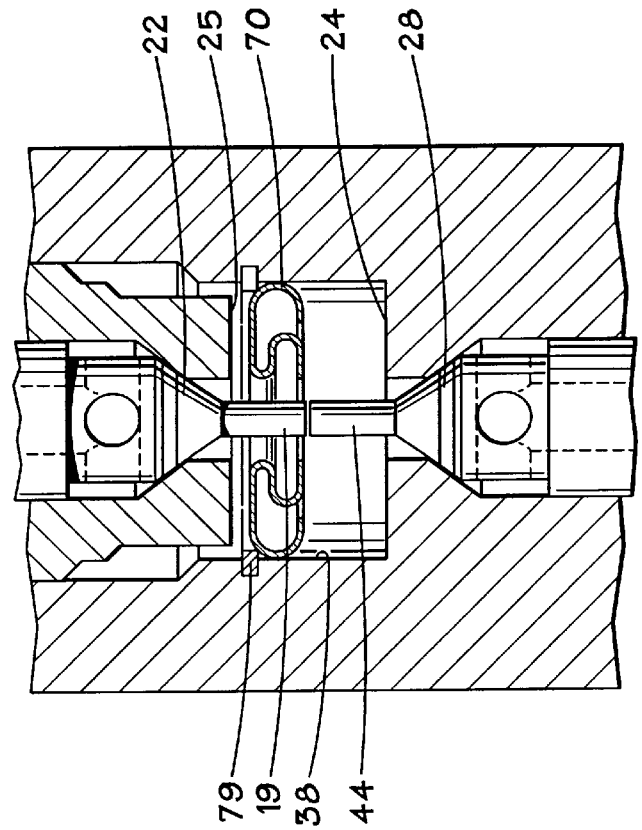
FIG. 7 is an expanded section view of the metal seal according to a fourth preferred embodiment of the invention, with the male member fully inserted into the female member receiving chamber.
Figure 8:
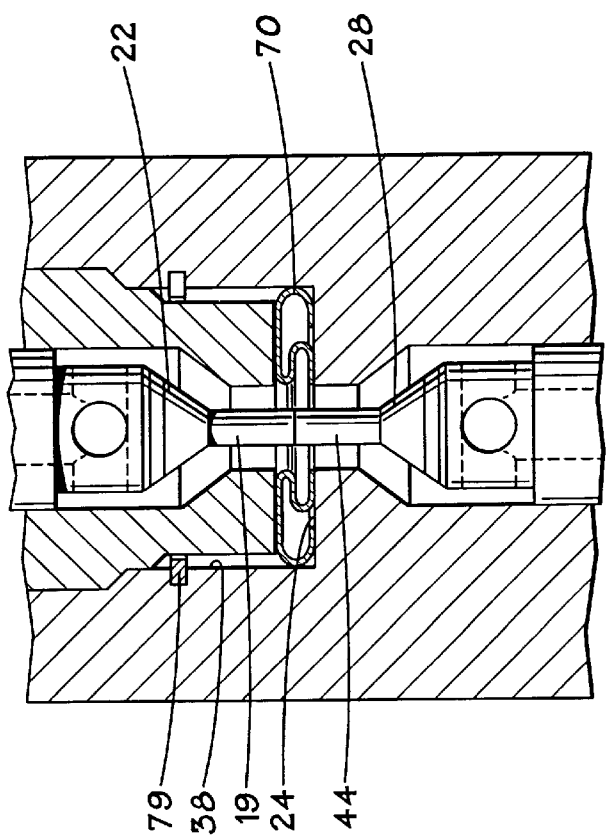
FIG. 8 is an expanded section view of the seal shown in FIG. 7, with the male member partially removed from the female member receiving chamber.

In FIG. 7, a fourth preferred embodiment of the present invention is shown and in this embodiment, metal seal 70 engages the leading face of the male member and shoulder surface 24 in the female member receiving chamber. A clip retainer 79 prevents seal 70 from blowing out the female member bore by limiting the longitudinal travel of the seal 70 as the male member is withdrawn from the female member receiving chamber. Until seal 70 reaches the retainer clip 79, it remains in sealing engagement with the leading face of the male member and the wall 38 of the receiving chamber. The seal of FIG. 7 is pressured energized such that hydraulic fluid pressure will urge the seal to remain in engagement with male member leading face and the wall 38 of the receiving chamber. In FIG. 8, metal seal 70 is shown after the male member has disengaged from the seal. The leading face 25 of the male member maintains a face type seal with the seal 70 until it reaches the retainer clip 79. In FIG. 9, seal 70 is shown with a seal retainer 80 having inclined shoulders 61 and 62. In this embodiment, the male member remains engaged with the 70 until the seal reaches retainer 80.

As shown, the present invention provides an undersea hydraulic coupling with a face-type seal that requires no external preload device. The male member of the coupling can separate partially from full engagement with the female member and still maintain the seal due to flexing and pressure energizing of the inner circumference of the seal. Once the limit of this flexing is reached, the inner circumference of the seal disengages the shoulder in the female member bore, and the male can withdraw further out of the female member while the outer portion of the seal maintains a pressure energized seal with the female member bore. The metal seal slides up the bore of the female member and the seal is maintained between the male and female coupling members. The outer circumference of the seal may be of slightly larger diameter than the female receiving chamber or bore, resulting in an interference fit and causing sufficient force to seal without application of fluid pressure.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling, comprising:
   (a) a male member having a cylindrical probe with a leading face;
   (b) a female member having a receiving chamber dimensioned to slidably receive the cylindrical probe therein, the receiving chamber having a cylindrical wall and an internal shoulder surface; and (c) a ring-shaped metal seal positioned adjacent the internal shoulder surface in the receiving chamber, the seal having an inner circumference configured to seal between the leading face of the male member and the internal shoulder surface in the receiving chamber, the seal having an outer circumference configured to seal radially with the cylindrical wall of the receiving chamber, the seal being slideable in the receiving chamber while the outer circumference remains in sealing engagement with the receiving chamber wall and the inner circumference of the seal remains in sealing engagement with the leading face of the male member when the male member is partially withdrawn from the receiving chamber.

2. The undersea hydraulic coupling of claim 1 wherein the metal seal has a Y-shaped cross section.

3. The undersea hydraulic coupling of claim 1 wherein the male and female members have internal valves for controlling the flow of hydraulic fluid between the coupling members.

4. The undersea hydraulic coupling of claim 1 wherein the inner circumference of the metal seal has opposing first and second legs and a cavity therebetween, the seal being pressure-energized to urge the first leg against the leading face of the male member and the second leg against the shoulder surface in the receiving chamber.

5. The undersea hydraulic coupling of claim 1 further comprising a retainer engaged with the female member for holding the metal seal in the receiving chamber when the coupling members are separated.

6. The undersea hydraulic coupling of claim 1 wherein the outer diameter of the metal seal has an interference fit with the cylindrical wall of the receiving chamber.

7. An undersea hydraulic coupling, comprising:

(a) a female coupling member having a stepped internal bore, a valve in the bore for controlling fluid flow therethrough, and at least one shoulder surface intermediate the bore;

(b) a male coupling member having a leading face and cylindrical body insertable into the stepped internal bore of the female member, an internal bore, and a valve in the bore for controlling fluid flow therethrough; and (c) a ring-shaped metal seal in the female member bore, the seal having a Y-shaped cross section, an inner circumference and an outer circumference, the inner circumference having first and second opposing legs extending radially inwardly and a cavity therebetween, the first leg engaging the male member leading face and the second leg engaging the shoulder surface intermediate the female member bore when the male member is fully inserted into the female member bore, the first and second legs being resiliently flexible whereby the inner circumference of the seal is compressed longitudinally between the male member leading face and the shoulder surface when the male member is fully inserted into the female member bore, the inner circumference expanding longitudinally when the male member is partially withdrawn from the female member bore, the seal maintaining sealing engagement between the leading face of the male member and the shoulder surface until the second leg disengages the shoulder surface, the first leg maintaining sealing engagement with the male member leading face and the outer circumference of the seal maintaining a radial seal with the female member bore after the second leg disengages the shoulder surface.

8. The undersea hydraulic coupling of claim 7 wherein the inner circumference of the seal is pressure-energized.

9. The undersea hydraulic coupling of claim 7 wherein the outer circumference of the seal is pressure-energized.

10. The undersea hydraulic coupling of claim 7 further comprising a seal retaining clip attached to the female member.

11. The undersea hydraulic coupling of claim 7 further comprising a sleeve insertable into the female member bore for holding the seal therein when the male member is fully removed from the female member.

12. A female member of an undersea hydraulic coupling, comprising a body having a stepped internal bore with at least one internal shoulder, a valve in the bore, and a ring-shaped metal seal positioned on the shoulder in the bore in a first position, the seal having an outer circumference sealing with the bore adjacent the shoulder, the seal slideable longitudinally from the first position abutting the shoulder to a second position in the bore spaced longitudinally from the first position, the outer circumference of the seal maintaining sealing engagement with the bore between the first and second positions.

13. The female coupling member of claim 12 wherein the outer circumference of the seal is resiliently compressible to fit in the bore.

14. The female coupling member of claim 12 wherein the ring-shaped metal seal is Y-shaped in cross section.

15. The female coupling member of claim 12 wherein the seal has an inner circumference with a pair of opposing legs extending radially inwardly, and a cavity between the opposing legs.

16. The female coupling member of claim 15 wherein the inner circumference of the seal is pressure energized by fluid pressure in the cavity.

17. The female coupling member of claim 12 further comprising a seal retaining member engaged to the female coupling member, the seal retaining member preventing sliding of the seal beyond the second position.

* * * * *